(12) United States Patent
Sasaki et al.

(10) Patent No.: US 8,645,392 B2
(45) Date of Patent: Feb. 4, 2014

(54) PRIVACY PROTECTION DEVICE, PRIVACY PROTECTION METHOD, AND LIFE LOG MANAGEMENT SYSTEM

(75) Inventors: Kazuo Sasaki, Kawasaki (JP); Shigeki Fukuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 357 days.

(21) Appl. No.: 13/047,394

(22) Filed: Mar. 14, 2011

(65) Prior Publication Data

US 2011/0231408 A1 Sep. 22, 2011

(30) Foreign Application Priority Data

Mar. 18, 2010 (JP) .................................. 2010-62455

(51) Int. Cl.
*G06F 17/30* (2006.01)
(52) U.S. Cl.
USPC .......................................... 707/748; 707/758
(58) Field of Classification Search
USPC ......................................... 707/727, 748, 758
See application file for complete search history.

(56) References Cited

U.S. PATENT DOCUMENTS

| | | | | |
|---|---|---|---|---|
| 6,480,850 B1 * | 11/2002 | Veldhuisen | ................... | 707/610 |
| 7,945,585 B1 * | 5/2011 | Sorkin et al. | .................. | 707/784 |
| 7,975,150 B1 * | 7/2011 | Lillibridge et al. | ........... | 713/193 |
| 8,073,853 B2 * | 12/2011 | Schran et al. | ................. | 707/748 |
| 2006/0069749 A1 * | 3/2006 | Herz et al. | ..................... | 709/219 |
| 2011/0191185 A1 * | 8/2011 | Schroeder et al. | ......... | 705/14.58 |
| 2011/0202551 A1 * | 8/2011 | Agrawal | ....................... | 707/769 |

FOREIGN PATENT DOCUMENTS

JP 2005-234866 9/2005

* cited by examiner

*Primary Examiner* — John E Breene
*Assistant Examiner* — Andalib Lodhi
(74) *Attorney, Agent, or Firm* — Fujitsu Patent Center

(57) ABSTRACT

A privacy protection device includes an attribute update frequency management unit configured to calculate and record therein an update frequency of each attribute included in a life log of a user in response to storing of the life log; a static attribute extraction unit configured to calculate a threshold value of a change frequency on the basis of a static attribute, an attribute the update frequency of which is less than or equal to the calculated threshold value of the change frequency, the update frequency being recorded by the attribute update frequency management unit; and a notification request reception unit configured to extract the number of users satisfying the notification condition of the notification request, accept the registration of the notification request from the service provider when the extracted number of users exceeds the limit number of persons.

7 Claims, 14 Drawing Sheets

FIG. 3

| USER ID | UPDATE TIME | GENDER | ADDRESS | HOBBY | CURRENT LOCATION |
|---|---|---|---|---|---|
| USER A | 2009/9/10 8:10 | MALE | AKASHI | FISHING | SHIBUYA |
| USER B | 2009/9/14 10:25 | FEMALE | OKUBO | TENNIS | OKUBO |
|  | 2009/9/14 13:20 | FEMALE | OKUBO | TENNIS | KOUBE |

FIG. 4

| SUB ID | REGISTRATION TIME | NOTIFICATION CONDITION | NOTIFICATION DESTINATION URL |
|---|---|---|---|
| ID 003 | 2009/6/5 20:30 | GENDER = FEMALE & HOBBY = TENNIS & CURRENT LOCATION = SANNOMIYA" | http://XX.test/bbb |
| ID 002 | 2009/6/5 20:30 | HOBBY = FISHING & CURRENT LOCATION = SHONAN SEASIDE" | http://XX.hoge/aaa |

FIG. 5

| ATTRIBUTE | UPDATE FREQUENCY (PER DAY) |
|---|---|
| GENDER | 0 PERSON |
| ADDRESS | 2 PERSONS |
| HOBBY | 3 PERSONS |
| CURRENT LOCATION | 5000 PERSONS |

FIG. 6

NOTIFICATION CONDITION : GENDER = FEMALE & ADDRESS = OKUBO & LOCATION = SANNOMIYA

NOTIFICATION DESTINATION URL : http://hoge/com/A

SERVICE AVAILABLE TIME PERIOD : 7 DAYS

FIG. 8

SUB ID = 001-223

USER ID = USER A

NOTIFICATION CONDITION: GENDER = FEMALE & ADDRESS = OKUBO & LOCATION = SANNOMIYA

FIG. 12

| SERVICE ID | Subscribe ID | CONDITION | START | END | TIME PERIOD |
|---|---|---|---|---|---|
| http://hoge.com/A | 001-33 | GENDER = FEMALE & INTEREST = FASHION & LOCATION = OSAKA STATION" | 2008/12/11 12:00 | 2008/12/9 12:00 | 9 DAYS |
| | 001-34 | GENDER = FEMALE & INTEREST = FASHION & LOCATION = SANNOMIYA" | 2009/1/7 12:00 | 2009/1/10 12:00 | 4 DAYS |
| | 001-35 | ... | ... | ... | 8 DAYS |
| http://www.taro.com/B | 002-11 | ADDRESS = OKINAWA & LOCATION = HOKKAIDO" | 2006/1/11 12:00 | 2006/7/1 12:00 | 181 DAYS |
| | 002-55 | ADDRESS = HOKKAIDO & LOCATION = OKINAWA" | 2006/2/3 12:00 | 2006/8/5 12:00 | 182 DAYS |
| | 002-22 | ... | ... | ... | 179 DAYS |

PRIVACY PROTECTION DEVICE, PRIVACY PROTECTION METHOD, AND LIFE LOG MANAGEMENT SYSTEM

CROSS-REFERENCE TO RELATED APPLICATIONS

This application is based upon and claims the benefit of priority of the prior Japanese Patent Application No. 2010-62455, filed on Mar. 18, 2010, the entire contents of which are incorporated herein by reference.

FIELD

The present invention relates to a privacy protection technique used in the provision of personal information.

BACKGROUND

In recent years, since mobile phones with various kinds of built-in sensors such as GPSs or the like have been widely used, it has been possible to collect daily action histories (life logs) such as the location information, the buying histories, and the like of users in real time on a server side. In addition, using these pieces of the information collected on the server side, a recommending service or the like in which recommended information is distributed to a user on the basis of the location or the preference of the user is being realized.

On the other hand, when information is provided to a service provider on the basis of these pieces of the life log information collected on the server side, it is necessary to protect privacy so that an individual is not identified on the basis of the provided information. In response, in a case in which a privacy information acquisition request (a request for location information) based on the location information is received from the service provider, only when there are plural users having the attribute value thereof, the number of the users being at least greater than or equal to K (the number satisfying a K-anonymity criterion), desired information is provided. In this way, Japanese Laid-open Patent Publication No. 2005-234866 discloses a method in which a privacy risk due to the limited number of users is solved owing to the reduced number of users to be dealt with.

SUMMARY

A privacy protection device used in a life log management system that collects and stores user information as a life log, accepts registration of a notification request from a service provider, and notifies the service provider of data relating to a life log of a user satisfying a notification condition of the notification request, the privacy protection device includes: an attribute update frequency management unit configured to calculate and record therein an update frequency of each attribute included in a life log of a user in response to storing of the life log; a static attribute extraction unit configured to calculate a threshold value of a change frequency on the basis of a service available time period of the service provider and the number of users satisfying a preliminarily set limit number of persons, and extract, as a static attribute, an attribute the update frequency of which is less than or equal to the calculated threshold value of the change frequency, the update frequency being recorded by the attribute update frequency management unit; and a notification request reception unit configured to extract the number of users satisfying the notification condition of the notification request, with respect to the static attribute extracted by the static attribute extraction unit, and accept the registration of the notification request from the service provider when the extracted number of users exceeds the limit number of persons.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a life log;

FIG. 4 is a diagram illustrating an example of a notification request registration DB;

FIG. 5 is a diagram illustrating an example of an attribute update frequency DB;

FIG. 6 is a diagram illustrating an example of a Subscribe request;

FIG. 8 is a diagram illustrating an example of notification information of which a service provider is notified;

FIG. 12 is a diagram illustrating an example of a notification request registration history DB;

DESCRIPTION OF EMBODIMENTS

Embodiments of the present invention will be described in detail with reference to figures. First, a problem addressed by the present invention will be described, and subsequently, the embodiments will be described. The above-mentioned existing method is a method in which, when a service provider side makes a search request to a server that manages life logs, the service provider side receives desired information in a case in which K-anonymity is satisfied. Accordingly, when the service provider performs timely recommendation on the basis of dynamically changing information such as location information, a processing operation is necessary in which search is performed at regular intervals, or the like. There is a problem in which, when the interval of search is widened, it is difficult to perform timely recommendation, and on the other hand, when the interval of search is narrowed, a processing load increases.

On the other hand, a method (Subscribe/Notify model) may be considered in which, only when a search condition is registered in a server in advance, and dynamically changing information matches the registered condition, the server notifies the service provider of a life log. In the present model, the following problem occurs depending on when it is determined whether or not the above-mentioned K-anonymity is satisfied.

First, in a case in which the determination is performed when a notification condition is registered (when Subscribe is performed), when a frequently changed attribute such location information or the like (for example, a case in which a current location corresponds to a train station, or the like) is set as a condition, the registration itself thereof is difficult if the number of persons satisfying the condition K is small at the time by chance.

In addition, in a case in which the notification condition is matched, and the service provider is actually notified of the life log(when Notify is performed), when the number of users satisfying a condition at the time of Subscribe is less than K, and the attribute of a specified condition is an attribute with little frequent change (examples: a gender, an address, and the like), the service provider is semipermanently notified of no Notify, and hence it is difficult for the service provider side to understand that a meaningless condition is set.

The present invention realizes anonymity protection in the above-mentioned Subscribe/Notify model, and enables a life log to be provided.

First Embodiment

Figure 1:
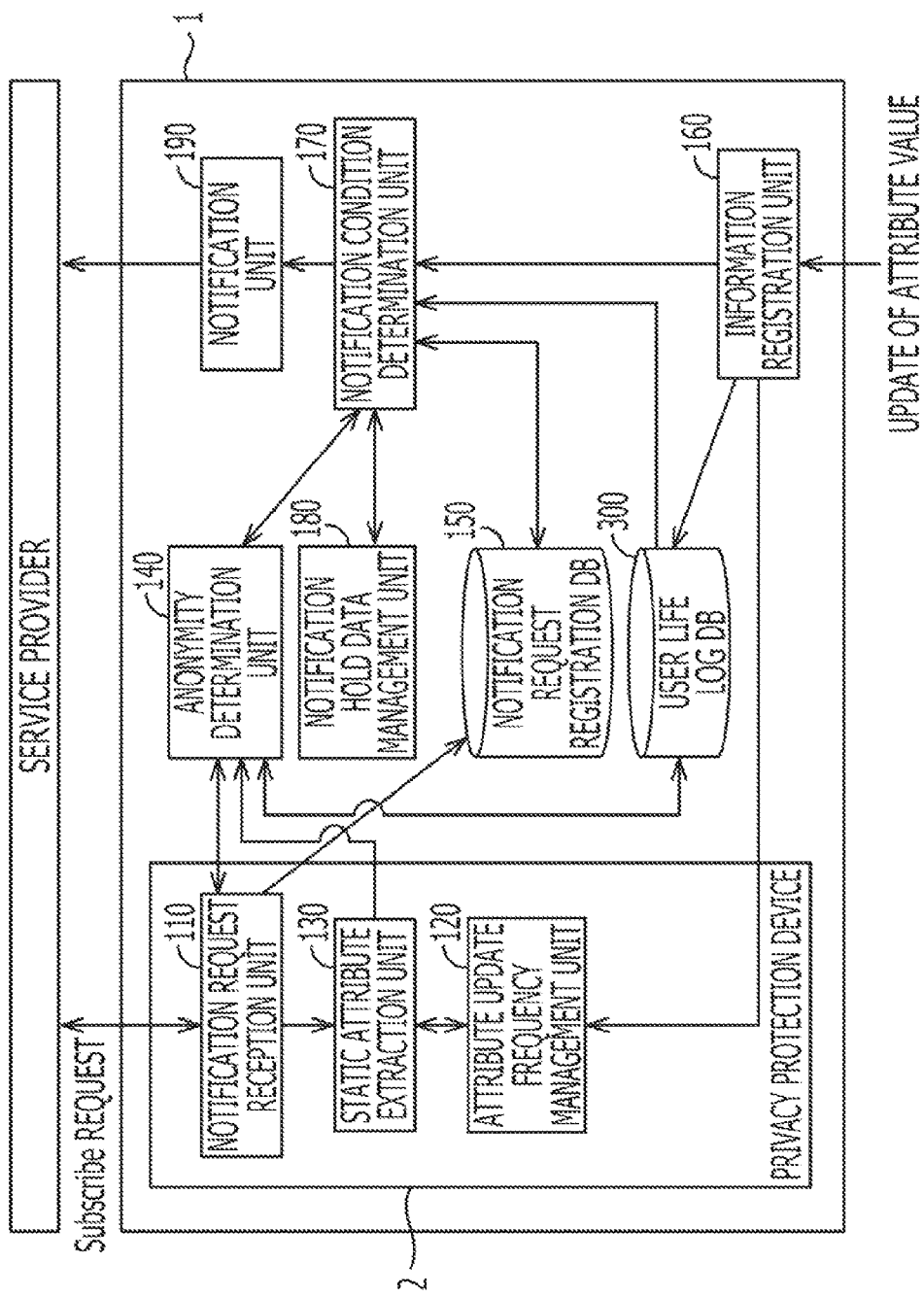
FIG. 1 is a block diagram illustrating examples of configurations of a life log management system according to a first embodiment of the present invention and a privacy protection device in the system.

FIG. 1 is a block diagram illustrating an example of the configuration of a life log management system 1 according to a first embodiment of the present invention. The life log management system 1 is equipped with a privacy protection device 2 according to the present invention. In the present system, user information is collected and stored as a life log in a user life log DB 300. The registration of a notification request is accepted from a service provider, and the life log of a user satisfying a notification condition for the notification request the registration of which is accepted is extracted from the user life log DB 300, and the service provider is notified of the life log. The life log recorded in the user life log DB 300 is data indicating the action history of a user, the nature of the user, the character of the user, and the like, and includes the information of at least one attribute. For example, as illustrated in FIG. 3, the life log is data including a user ID, an update time, a gender, an address, a hobby, and a current location.

In FIG. 1, the life log management system 1 includes a privacy protection device 2 including a notification request reception unit 110, an attribute update frequency management unit 120, and a static attribute extraction unit 130, an anonymity determination unit 140, a notification request registration DB 150, an information registration unit 160, a notification condition determination unit 170, a notification hold data management unit 180, a notification unit 190, and a user life log DB 300.

In addition, the configurations of the life log management system 1 and the privacy protection device 2 are not limited to the examples illustrated in FIG. 1. For example, a configuration may be adopted in which the privacy protection device 2 includes the other functions such the anonymity determination unit 140 and the like. A configuration may be adopted in which the privacy protection device 2 and the other functions of the life log management system 1 are provided in two connected computers, respectively. In addition, a configuration may be adopted in which the functions of the privacy protection device 2 and the life log management system 1 are distributed in a plurality of computers.

The notification request reception unit 110 accepts a notification request registration (called "Subscribe", hereinafter) from the service provider. For example, the notification request reception unit 110 accepts, from the service provider, Subscribe including a notification condition to be satisfied by each attribute of the life log of a user, a notification destination, and a service available time period for the service provider. In addition, when the anonymity determination unit 140 described later determines on the basis of a static attribute that there is a possibility that the number of users satisfying the notification condition is exceeds the number of limit number of persons, the notification request reception unit 110 registers the Subscribe in the notification request registration DB 150. For example, as illustrated in FIG. 4, data including a Sub ID, a registration time, a notification condition, and a notification destination URL is registered in the notification request registration DB 150, and hence the registration of the Subscribe is performed.

On the basis of the life log of the user input through the information registration unit 160 described later, the attribute update frequency management unit 120 calculates and records the update frequency of each attribute included in the life log. For example, as illustrated in FIG. 5, the attribute update frequency management unit 120 records in an attribute update frequency DB (not illustrated in FIG. 5) the attribute and the update frequency (for example, the number of persons of update per day) with associating the attribute with the update frequency.

The static attribute extraction unit 130 calculates the threshold value of a change frequency on the basis of the service available time period of the service provider, accepted in the notification request reception unit 110, and the number of users satisfying a preliminarily set notification condition, and extracts, as a static attribute, an attribute the update frequency of which is less than or equal to the calculated threshold value of the change frequency, the update frequency being managed by the attribute update frequency management unit 120.

For example, the static attribute extraction unit 130 sets, as the threshold value of the change frequency, a value calculated by dividing the number of users satisfying the preliminarily set notification condition by the service available time period of the service provider. The attribute the update frequency of which is less than or equal to the calculated threshold value of the change frequency can be extracted as the static attribute, the update frequency being managed by the attribute update frequency management unit 120.

With respect to the static attribute extracted by the static attribute extraction unit 130, the anonymity determination unit 140 extracts the number of users satisfying the notification condition for the notification request the registration of which has been accepted, by referring to the user life log DB 300, and determines that the extracted number of users exceeds a limit number of person satisfying the notification condition of the Subscribe. Accordingly, it can be determined whether or not there is a possibility that information to be notified to the service provider in accordance with the notification condition satisfies a condition satisfying anonymity, namely, a condition that satisfies the number of users satisfying the notification condition.

Furthermore, when determining that the number of users satisfying the notification condition of the Subscribe from the service provider exceeds the number of users satisfying the notification condition, the anonymity determination unit 140 registers the Subscribe in the notification request registration DB 150.

The information registration unit 160 accepts the update registration of a life log or the initial registration of a life log from the communication device of the user, and registers the life log in the life log DB 300. Examples of the communication device of the user include a mobile phone, a personal computer, a PDA, and the like.

When the life log of the user is newly added to the user life log DB 300, the notification condition determination unit 170 determines whether or not the added life log of the user satisfies the notification condition of the notification request, registered in the notification request registration DB 150. When it is determined that the added life log satisfies the notification condition, the notification condition determination unit 170 extracts the life log of another user satisfying the notification condition from the user life log DB 300. When the number of users of the extracted life logs does not reach the number of users satisfying the notification condition, the notification condition determination unit 170 puts on hold the notification of data relating to the life log to the service provider, and registers the life log put on hold in the notification hold data management unit 180.

In addition, when it is determined that the added life log of the user satisfies the notification condition, the notification condition determination unit 170 extracts another user satisfying the notification condition. When the number of the extracted users reaches the number of users satisfying the notification condition, the notification condition determination unit 170 notifies the service provider of the data of the life log corresponding to the notification condition through the notification unit 190.

The notification hold data management unit 180 stores data relating to a life log, the notification of the life log to the service provider having been put on hold. When the notification condition determination unit 170 determines that the number of users satisfying the notification condition reaches the number of users satisfying the notification condition, data relating to the life log put on hold is notified to the service provider through the notification unit 190, along with the data of a life log updated in or added to the user life log DB 300.

In accordance with a processing operation performed in the notification condition determination unit 170, the notification unit 190 notifies (Notify) the service provider of data relating to a life log that corresponds to the notification condition.

Figure 2:
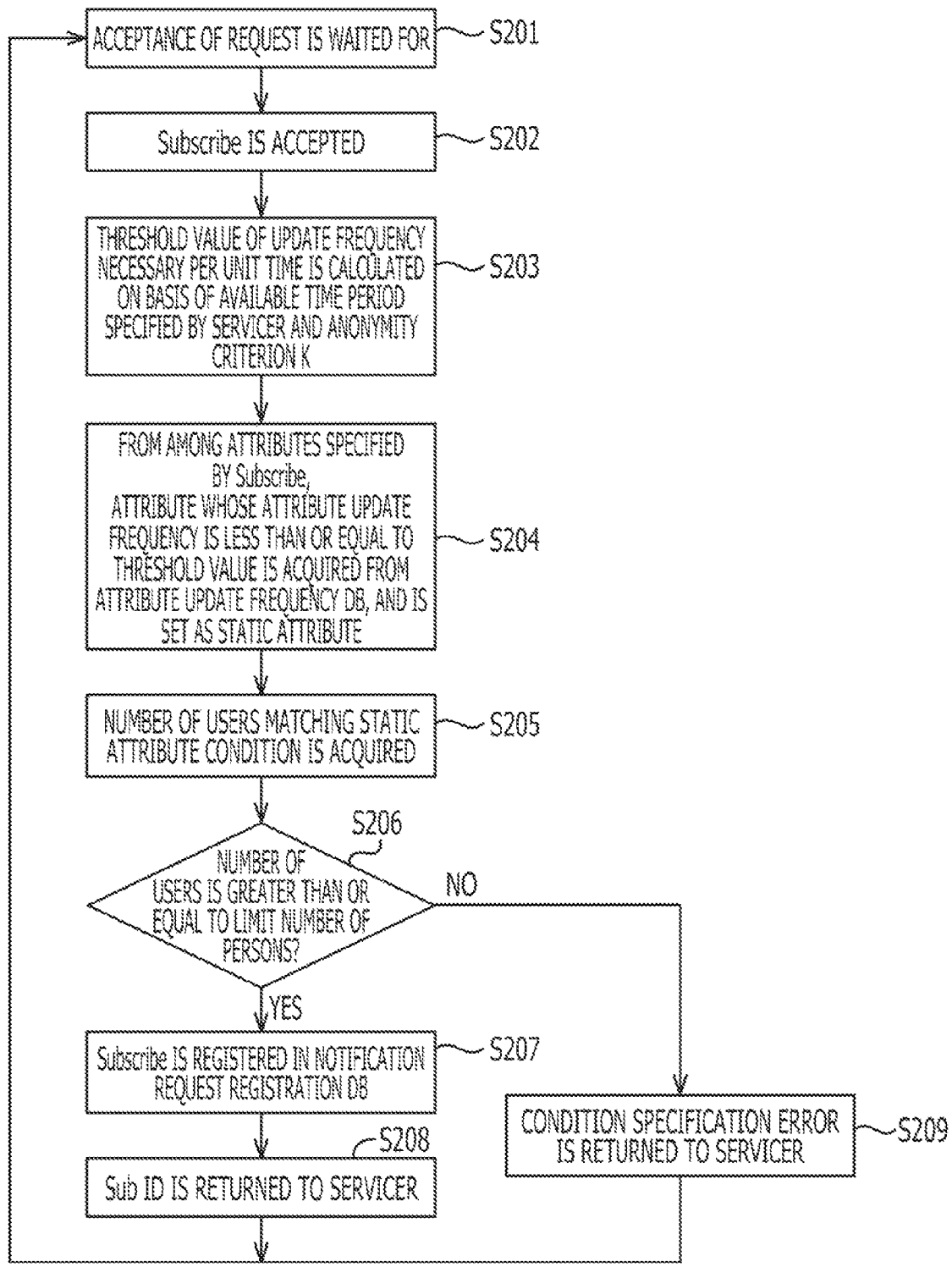
FIG. 2 is a flow illustrating an example of a processing operation performed when Subscribe is performed in the first embodiment of the present invention.

Hereinafter, a processing operation performed when Subscribe is performed in the first embodiment of the present invention will be described in accordance with a flow diagram illustrated in FIG. 2. In addition, in the first embodiment, a configuration will be described in which the service provider side specifies a service available time period at the time of Subscribe.

First, the notification request reception unit 110 accepts the Subscribe. Here, the notification request reception unit 110 accepts the Subscribe indicating "notification condition: a gender=female & an address=Okubo & a location=Sannomiya", "a notification destination URL: http://hoge.com/A", and "a service available time period: 7 days", as illustrated in FIG. 6 (Steps S201→S202).

Next, the static attribute extraction unit 130 calculates the threshold value of a change frequency per day on the basis of the available time period 7 days. For example, in the static attribute extraction unit 130, when the number K of users satisfying the notification condition is 100 (in the present embodiment, it is assumed that the number of users satisfying the notification condition is 100), 100/7=14.3 persons turns out to be the threshold value of the change frequency (Step S203).

From among attributes (gender, an address, and a location) specified as a condition, the static attribute extraction unit 130 extracts an attribute the update frequency of which is less than or equal to the above-mentioned threshold value (14.3 persons) from the update frequency management unit 120. For example, in an example illustrated in FIG. 5, it is assumed that a gender and an address are extracted as static attributes (Step S204).

Next, the anonymity determination unit 140 receives "a gender=female & an address=Okubo" that is the notification condition of the static attributes. The anonymity determination unit 140 searches other users satisfying the notification condition of the static attributes by referring to life logs, and acquires the number of the users (Step S205).

Next, the anonymity determination unit 140 determines whether or not the acquired number of the users exceeds the number of users, 100 persons, satisfying the notification condition (Step S206).

When, in Step S206, it is determined that the acquired number of the users exceeds the number of users, 100 persons, the notification request reception unit 110 accepts a Subscribe request, generates a Sub ID, and registers the Sub ID in the notification request registration DB 150 along with Subscribe information (Step S207). In addition, the notification request reception unit 110 returns the Sub ID to the service provider (Step S208). On the other hand, when, in Step S206, it is determined that the acquired number of the users does not exceed the number of users, 100 persons, the notification request reception unit 110 returns a registration error to the service provider (Steps S206→S209).

Accordingly, by performing the determination on the basis of the static attributes, at the time of Subscribe it is possible to avoid a situation in which the registration itself is impossible, even if an attribute such as location information or the like, which frequently changes, is set as a condition.

Figure 7:
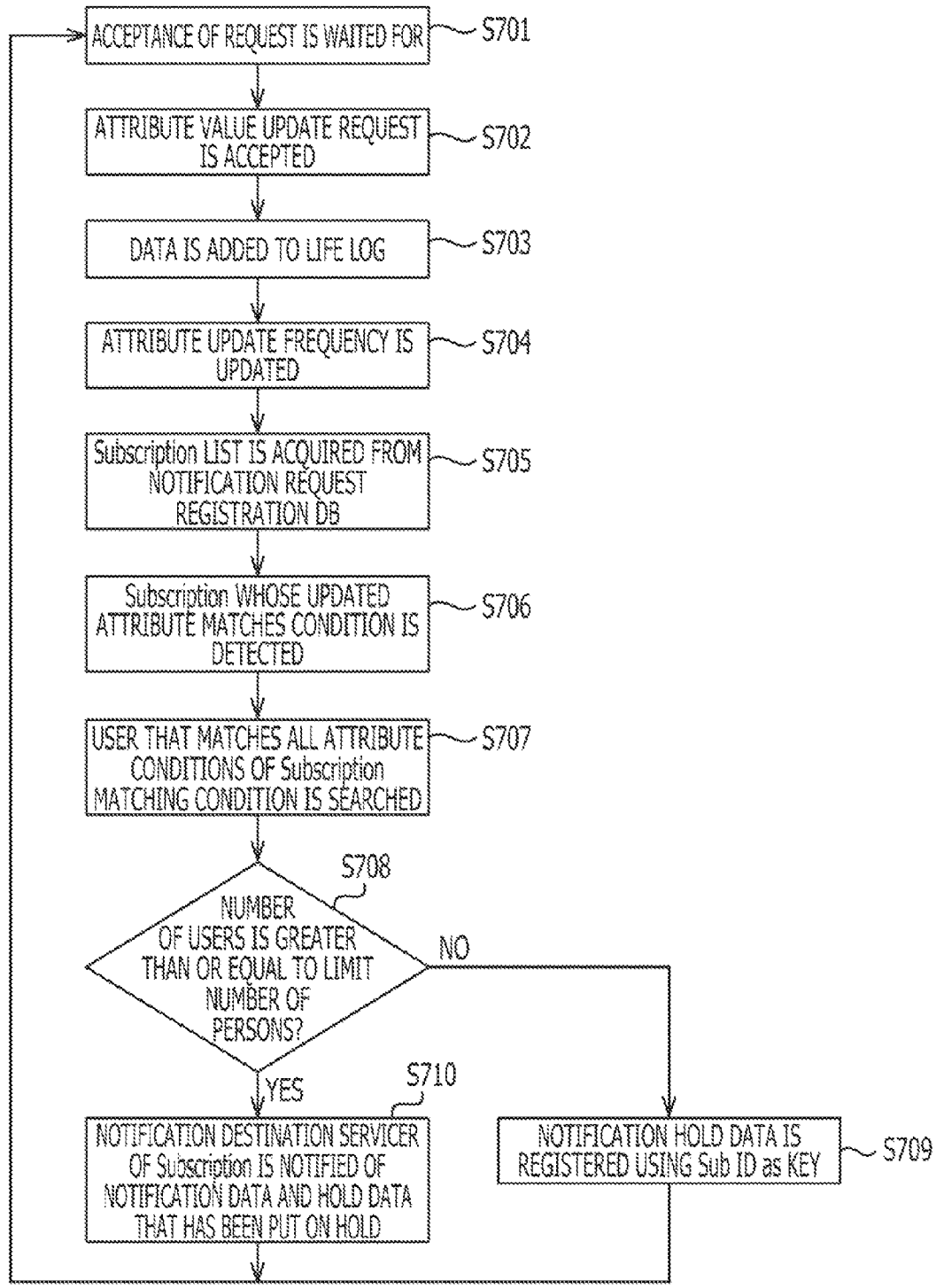
FIG. 7 is a flow illustrating an example of a processing operation performed when a life log of a user is updated in the first embodiment of the present invention.

Hereinafter, in accordance with a flow diagram illustrated in FIG. 7, a processing operation will be described that is performed when a life log of a user is updated in the first embodiment of the present invention.

Hereinafter, an example in which a mobile terminal device is used as the communication device of a user will be described as one example. First, it is assumed that a request for attribute update (a user ID=User A & a current location=Sannomiya) is accepted from the mobile terminal device of the user (Steps S701-S702).

Next, the information registration unit 160 registers a current time and a current location in the life log of the corresponding user (User A) (Step S703).

The information registration unit 160 notifies the attribute update frequency management unit 120 of attribute update (a current location attribute is changed). The attribute update frequency management unit 120 updates the update frequency of the updated attribute (Step S704).

Next, the information registration unit 160 makes a notification determination request to the notification condition determination unit 170. The notification condition determination unit 170 acquires, as the Subscribe information, a Subscription list from the notification request registration DB 150 (Step S705). For example, as illustrated in FIG. 4, the Subscription list is obtained by describing each Subscribe in a list form.

Next, it is assumed that the notification condition determination unit 170 extracts a Subscription (here, a Sub ID: 001-223, and a notification condition: "a user ID=User A & a current location=Sannomiya") the notification condition of which matches the life log of the User A (Step S706).

Next, the notification condition determination unit 170 searches other users that satisfy the notification conditions of the all attributes of the Subscription matching the notification condition, by referring to life logs in the user life log DB 300, and acquires the number of the users (Step S707).

Next, the notification condition determination unit 170 requests the anonymity determination unit 140 to determine whether or not the notification condition corresponding to the Sub ID 001-223 satisfies K-anonymity. By determining whether or not the number of users, 100 persons, which satisfy the notification conditions of the all attributes of the Subscription matching the notification condition is exceeded, the anonymity determination unit 140 determines whether or not the K-anonymity is satisfied (Step S708).

When, in Step S708, it is determined that the K-anonymity is not satisfied (the number of users, 100 persons, which satisfy the notification conditions, is not exceeded), the anonymity determination unit 140 uses the Sub ID as a key, and registers notification information in the notification hold data management unit 180 (Step S709).

On the other hand, when, in Step S708, it is determined that the K-anonymity is satisfied (the number of users, 100 persons, which satisfy the notification conditions, is exceeded), the anonymity determination unit 140 extracts notification information relating to the Sub ID 001-223 put on hold from the notification hold data management unit 180, and requests the notification unit 190 to perform a notification processing operation (Notify).

On the basis of the request for the notification processing operation, the notification unit 190 transmits the notification information to a corresponding service (http://hoge.com/A) (Steps S708-S710). For example, as illustrated in FIG. 8, "a Sub ID=001-223, a user ID=User A, and a notification condition: gender=female & an address=Okubo & a location=Sannomiya" are provided as notification information to a service provider.

Accordingly, at the time of Subscribe, by registering the notification request when the number of users, K persons, satisfying a condition is exceeded, it is possible to avoid a situation in which the service provider is semipermanently notified of no Notify, even if the attribute of a specified condition is an attribute with little frequent change.

Figure 9:
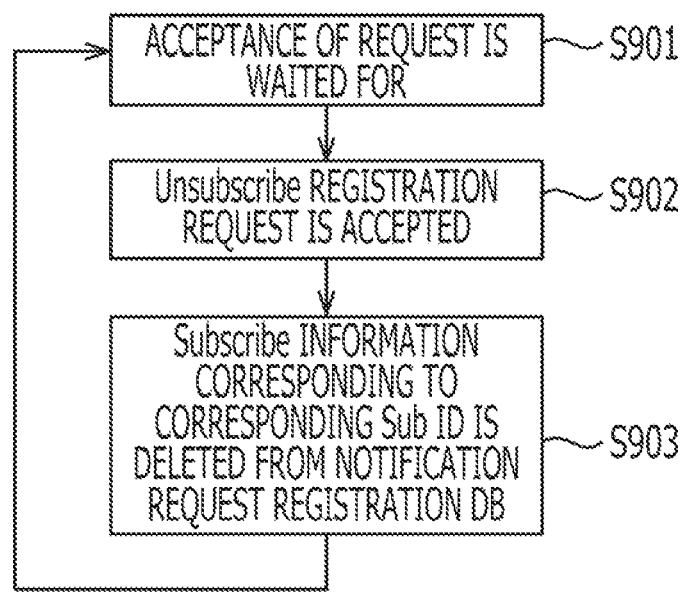
FIG. 9 is a flow illustrating an example of a processing operation performed when Unsubscribe is performed in the first embodiment of the present invention.

In addition, at the time of notification request deletion (Unsubscribe), as illustrated in a flow diagram in FIG. 9, the notification request reception unit 110 accepts an Unsubscribe request (Steps S901→S902), and deletes Subscribe information corresponding to the corresponding Sub ID from the notification request registration DB 150 (Step S903).

Second Embodiment

In a second embodiment, an example is illustrated in which the service provider does not specify the service available time period but the service available time period is automatically calculated from the notification request registration history of the service provider. In the second embodiment, when the service provider performs Unsubscribe, necessary information is acquired from the notification request registration DB 150, and the time period of Subscribe is calculated and recorded in the notification request registration history DB 210. In addition, when Subscribe is accepted from the same service provider next time, the average duration time of a past Subscribe is calculated in the service available time period determination unit 200, and hence the service available time period of the service provider is calculated. In addition, while, in the present embodiment, the uniqueness of the service provider is determined on the basis of a notification URL, an ID explicitly identifying the service may be used as a service provider ID.

Figure 10:
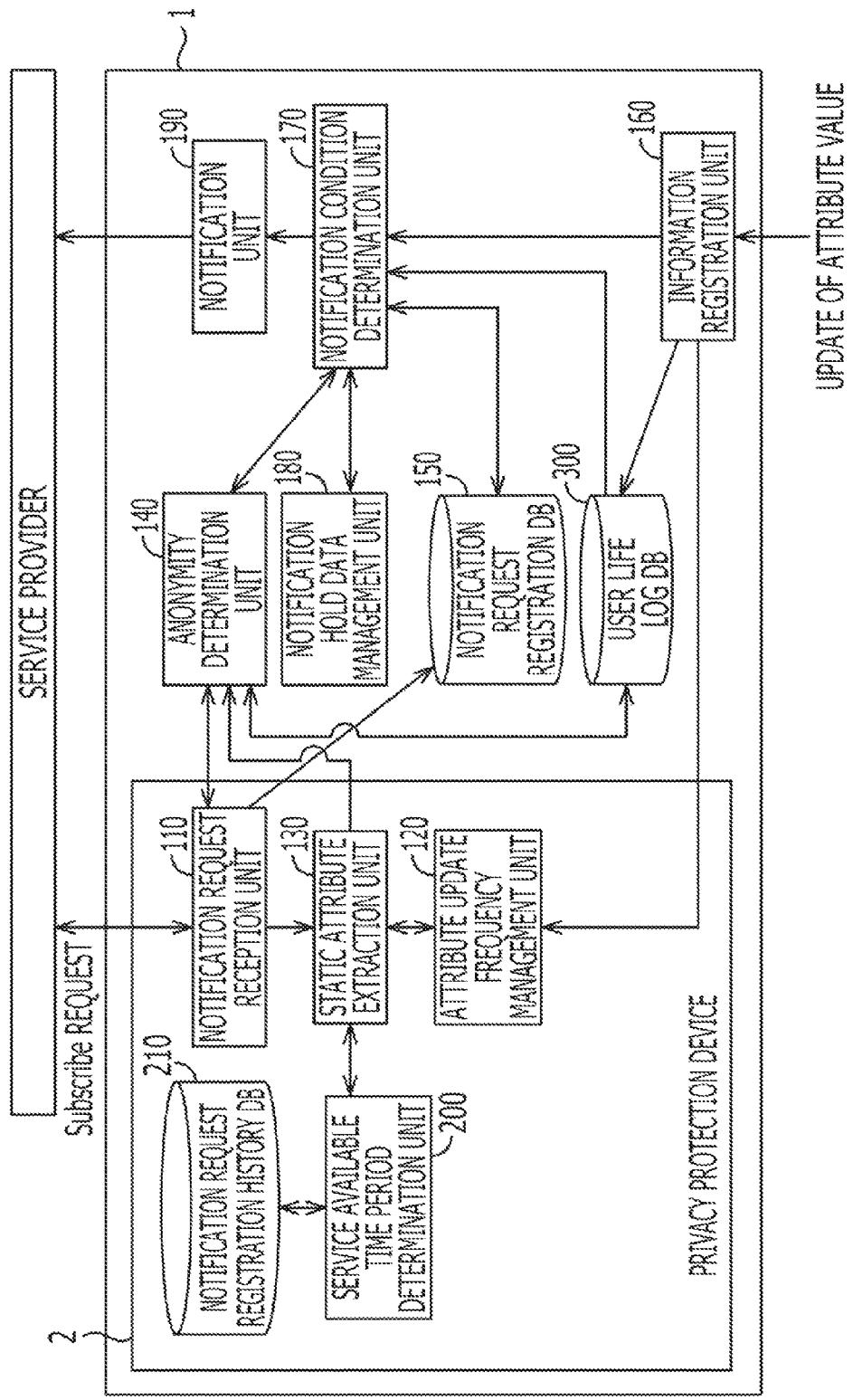
FIG. 10 is a block diagram illustrating examples of configurations of a life log management system according to a second embodiment of the present invention and a privacy protection device in the system.

FIG. 10 is a block diagram illustrating the configuration of a life log management system 1 according to the second embodiment of the present invention. In addition to the configuration of the first embodiment, a privacy protection device 2 further includes a service available time period determination unit 200 and a notification request registration history DB 210. In addition, the same symbol is assigned to the same configuration as that of the first embodiment.

In the second embodiment, the notification request registration history DB 210 and the service available time period determination unit 200 are included. The notification request registration history DB 210 maintains the registration history of a past notification request of the service provider. With respect to the service provider that registers a notification request, the service available time period determination unit 200 extracts the registration history of a past notification request from the notification request registration history DB 210, and calculates the service available time period of the corresponding service provider by calculating the average duration time of the registration history of the corresponding notification request.

For example, as illustrated in FIG. 12, in the notification request registration history DB 210, data including a service ID, a Sub ID, a notification condition, a time and date of the start of a service, a time and date of the end of the service, and a service time period is registered as a notification request registration history.

For example, the service available time period determination unit 200 uses the service ID as a key, acquires a corresponding Subscription from the notification request registration history DB 210, and calculates the average duration time from the number of acquired Subscriptions and the service time periods thereof. In addition, the calculated average duration time can be recorded as a service available time period in an available time period management table (not illustrated in FIG. 10).

For example, if the notification request registration history of a service ID (http://hoge.com/A) is referred to, the service time period of a Sub ID 001-33 corresponds to 9 days, the service time period of a Sub ID 001-34 corresponds to 4 days, and the service time period of a Sub ID 001-35 corresponds to 8 days, and hence the calculation result is (9+4+8)/3=7. Accordingly, the service available time period of the service ID (http://hoge.com/A) turns out to correspond to 7 days. In addition, if the notification request registration history of a service ID (http://taro.com/B) is referred to, the service time period of a Sub ID 002-11 corresponds to 181 days, the service time period of a Sub ID 002-55 corresponds to 182 days, and the service time period of a Sub ID 002-22 corresponds to 179 days, and hence the calculation result is (181+182+179)/3~180. Accordingly, the service available time period of the service ID (http://taro.com/B) turns out to correspond to 180 days.

Figure 11:
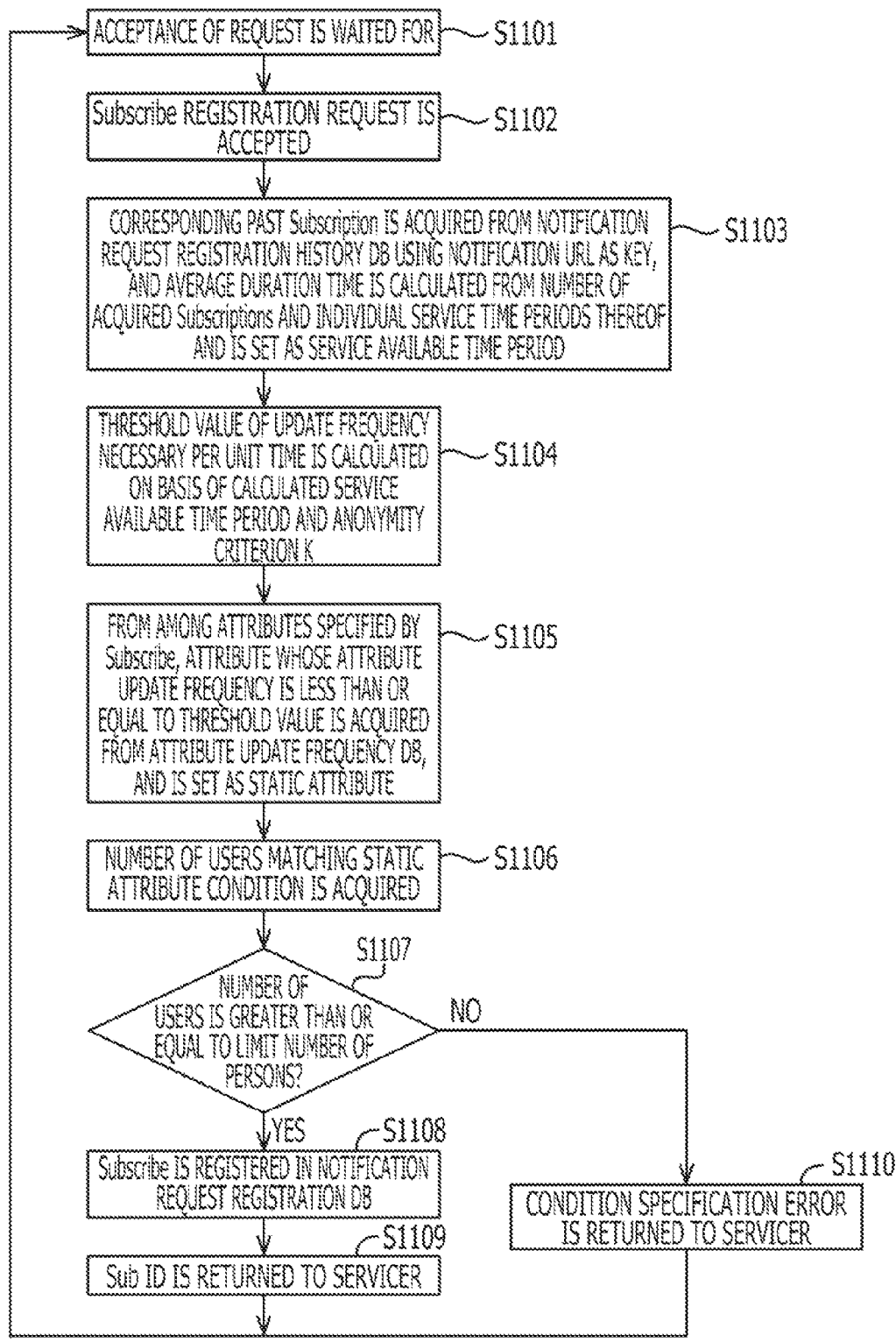
FIG. 11 is a flow illustrating an example of a processing operation performed when Subscribe is performed in the second embodiment of the present invention.

Hereinafter, in accordance with a flow diagram illustrated in FIG. 11, a processing operation will be described that is performed when Subscribe is performed in the second embodiment of the present invention.

First, the notification request reception unit 110 accepts the Subscribe. Here, for example, in the same way as the first embodiment, it is assumed that the notification request reception unit 110 accepts from the service provider the Subscribe indicating "a notification destination URL: http://hoge.com/A" along with "a notification condition: a gender=female & an address=Okubo & a location=Sannomiya" (Steps S1101→S1102).

Next, the service available time period determination unit 200 uses as a key the service ID that is a "notification destination URL" accepted by the notification request reception unit 110 through the static attribute extraction unit 130, and acquires a corresponding Subscription from the notification request registration history DB 210. In addition, the service available time period determination unit 200 calculates an average duration time from the number of acquired Subscriptions and the service time periods thereof, and sets the average duration time as a service available time period (Step S1103). Here, the data of a Sub ID 001-33 (the service time period thereof corresponds to 9 days), a Sub ID 001-34 (the service time period thereof corresponds to 4 days), and a Sub ID 001-35 (the service time period thereof corresponds to 8 days) are referred to as the notification request registration history of a notification destination URL (http://hoge.com/A). The sum of the service time periods of the referenced notification request registration history is divided by the number of registrations, and hence the calculation result is (9+4+8)/3=7. In addition, the service available time period of the notification destination URL (http://hoge.com/A) is set to 7 days.

Next, the static attribute extraction unit 130 calculates the threshold value of a change frequency per day from the calculated service available time period 7 days (Step S1104). Here, in the static attribute extraction unit 130, when the number K of users satisfying the notification condition is 100 (in the same way as in the first embodiment, it is assumed that the number of users satisfying the notification condition is 100), 100/7=14.3 persons is set as the threshold value of the change frequency (Step S203). From among attributes (gender, an address, and a location) specified as a condition, the static attribute extraction unit 130 extracts an attribute the update frequency of which is less than or equal to the threshold value (14.3 persons) from the update frequency management unit 120, and it may be assumed that the gender and the address are extracted as static attributes (Step S1105).

Next, the anonymity determination unit 140 receives "a gender=female & an address=Okubo" that is the notification condition of the static attributes. The anonymity determination unit 140 searches other users satisfying the notification condition of the static attributes by referring to life logs in the user life log DB 300, and acquires the number of the users (Step S1106).

Next, the anonymity determination unit 140 determines whether or not the acquired number of the users exceeds the number of users, 100 persons, satisfying the notification condition (Step S1107).

When, in Step S1107, it is determined that the acquired number of the users exceeds the number of users, 100 persons, the notification request reception unit 110 accepts a Subscribe request, generates a Sub ID, and registers the Sub ID in the notification request registration DB 150 along with Subscribe information (Step S1108). In addition, the notification request reception unit 110 returns the Sub ID to the service provider (Step S1109). On the other hand, when, in Step S1107, it is determined that the acquired number of the users does not exceed the number of users, 100 persons, the notification request reception unit 110 returns a registration error to the service provider (Steps S1107→S1110).

Figure 13:
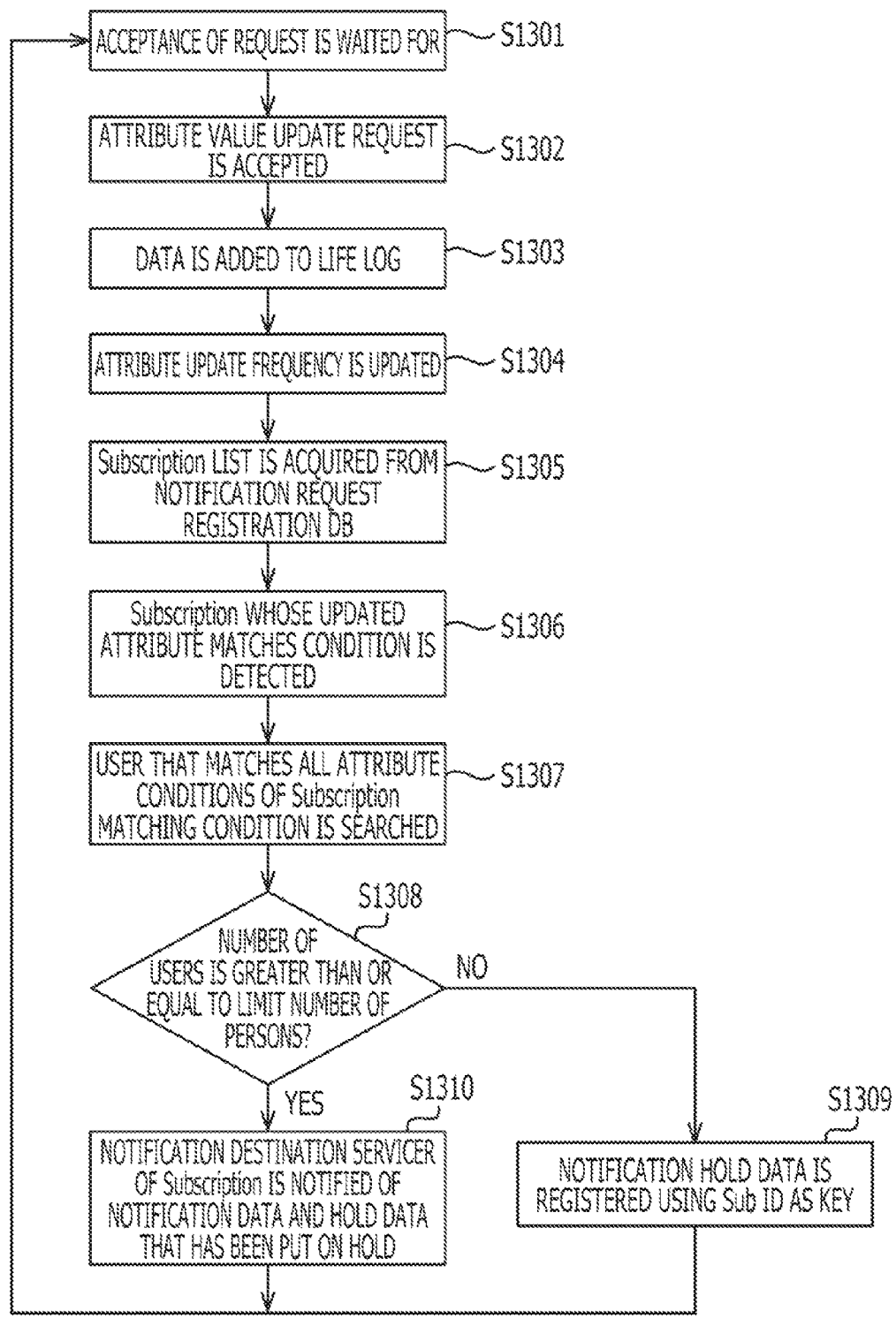
FIG. 13 is a flow illustrating an example of a processing operation performed when a life log of a user is updated in the second embodiment of the present invention.

Hereinafter, in accordance with a flow diagram illustrated in FIG. 13, a processing operation will be described that is performed when a life log of a user is updated in the second embodiment of the present invention.

Hereinafter, an example in which a mobile terminal device is used as the communication device of a user will be described as one example. First, it is assumed that the information registration unit 160 accepts a request for attribute update (a user ID=User A & a current location=Sannomiya) from the mobile terminal device of the user (Steps S1301→S1302).

Next, the information registration unit 160 registers a current time and a current location in the life log of the corresponding user (User A) registered in the user life log DB 300 (Step S1303).

The information registration unit 160 notifies the attribute update frequency management unit 120 of attribute update (a current location attribute is changed). The attribute update frequency management unit 120 updates the update frequency of the updated attribute (Step S1304).

Next, the information registration unit 160 makes a notification determination request to the notification condition determination unit 170. The notification condition determination unit 170 acquires, as the Subscribe information, a Subscription list from the notification request registration DB 150 (Step S1305).

Next, the notification condition determination unit 170 extracts a Subscription (here, a Sub ID: 001-223, a notification condition: "a user ID=User A & a current location=Sannomiya") the notification condition of which matches the life log of the User A (Step S1306).

Next, the notification condition determination unit 170 searches other users that satisfy the notification conditions of the all attributes of the Subscription matching the notification condition, by referring to life logs registered in the user life log DB 300, and acquires the number of the users (Step S1307).

Next, in order to determine whether or not the number of users, acquired in accordance with the notification condition of the Sub ID: 001-223, is the number K of users satisfying the notification condition (the K-anonymity is satisfied), the notification condition determination unit 170 requests the anonymity determination unit 140 to perform the determination. The anonymity determination unit 140 determines whether or not the number of users, which satisfy the notification conditions of the all attributes of the Subscription matching the notification condition, exceeds the number of users, 100 persons, satisfying the notification condition (Step S1308).

When, in Step S1308, it is determined that the number K of users satisfying the notification condition is not satisfied (the number of users, 100 persons, which satisfy the notification condition, is not exceeded), the anonymity determination unit 140 uses the Sub ID as a key, and registers notification information in the notification hold data management unit 180 (Step S1309).

On the other hand, when, in Step S1308, it is determined that the K-anonymity is satisfied (the number of users, 100 persons, which satisfy the notification condition is exceeded), the anonymity determination unit 140 extracts notification information relating to the Sub ID 001-223 put on hold from the notification hold data management unit 180, and requests the notification unit 190 to perform a notification processing operation.

On the basis of the request for the notification processing operation, the notification unit 190 transmits the notification information to a corresponding service (http://hoge.com/A) (Steps S1308→S1310). For example, as illustrated in FIG. 8, "a Sub ID=001-223, a user ID=User A, and a notification condition: gender=female & an address=Okubo & a location=Sannomiya" are provided as notification information to a service provider.

Figure 14:
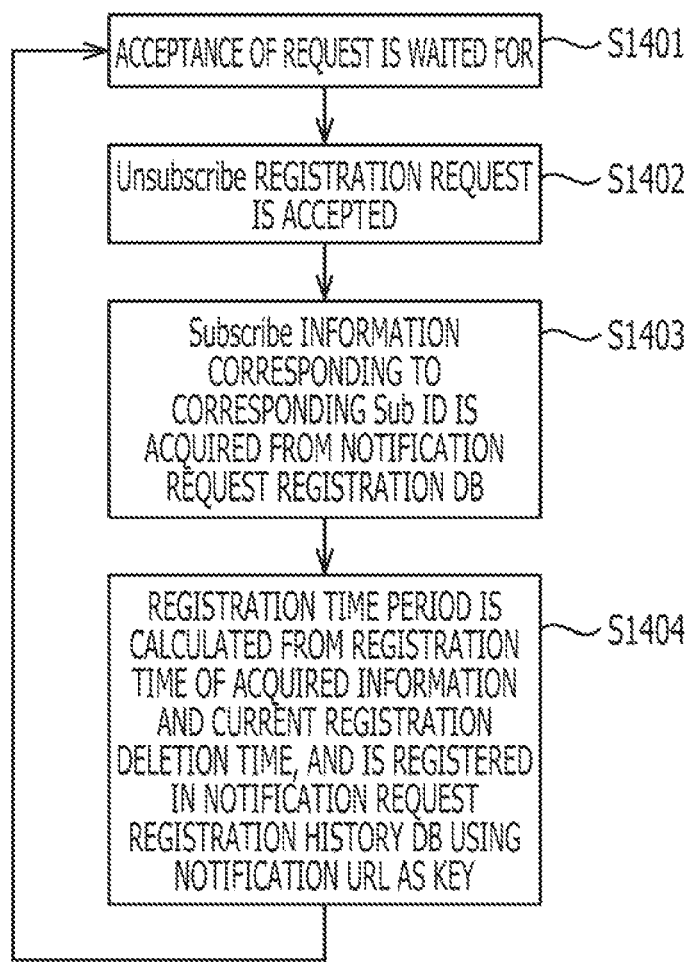
FIG. 14 is a flow illustrating an example of a processing operation performed when Unsubscribe is performed in the second embodiment of the present invention.

In addition, at the time of notification request deletion (Unsubscribe), as illustrated in a flow diagram in FIG. 14, the notification request reception unit 110 accepts an Unsubscribe request (Steps S1401→S1402), and deletes Subscribe information corresponding to a corresponding Sub ID from the notification request registration DB 150 (Step S1403). In addition, the notification request reception unit 110 calculates a registration time period from the registration time of the acquired Subscribe information and a current registration deletion time, uses a notification URL as a key, and registers the Subscribe information in the notification request registration history DB 210 (Step S1404).

As described above, according to the present embodiment, anonymity protection in the Subscribe/Notify model can be realized. In addition, while the anonymity of a user is secured for user information that dynamically changes, the service provider can use a Subscribe/Notify mechanism. Therefore, no polling operation is necessary, and it is possible to reduce the consumption of resources on the service provider side. Furthermore, since the service provider can understand a low likelihood that the K-anonymity is satisfied at the time of Subscribe registration, the service provider can tune the specification of a condition, and hence convenience viewed from the service provider is improved.

In addition, instead of storing the data of the life log in chronological order, current up-to-date information may only be maintained as presence data. For example, when an attribute update notification is received from a user terminal, the maintenance of the presence data can be realized by overwriting a corresponding item instead of adding data to the life log. Accordingly, it is possible to prevent the data amount of the life log from being enlarged.

The configurations described in the embodiments are simply used for illustrating specific examples, and do not restrict the technical scope of the present invention. An arbitrary configuration can be adopted without departing from the advantageous effect of the invention. While, in the embodiments described above, a case has been described in which the present invention is applied to the system, the present invention may be realized as an information processing device.

In addition, the embodiments of the present invention also include a case, in which a program of software for realizing the embodiments described above (a program corresponding to a flow diagram in the embodiments) is supplied to a device, and a computer in the device reads out and executes the supplied program, thereby accomplishing the realization of the embodiment. Accordingly, the program itself to be installed into the computer so as to realize functional processing described in the present embodiments with the computer is also one embodiment of the present invention. Namely, the program used for realizing the functional processing of the present invention is also included in one aspect of the embodiments. In addition, a medium in which the program used for realizing the functional processing of the present invention is recorded is also included in one aspect of the embodiments.

What is claimed is:

1. A privacy protection device comprising:
a memory; and
a processor coupled to the memory, the processor configured to
calculate and record therein an update frequency of each attribute included in a life log of a user in response to storing of the life log,
calculate a threshold value of a change frequency on the basis of a service available time period of a service provider and a number of users satisfying a set number of persons,
extract an attribute of the recorded update frequency of which is less than or equal to the calculated threshold value of the change frequency,
extract a number of users satisfying a notification condition of a notification request, with respect to the extracted attribute, and
accept registration of the notification request from the service provider when the extracted number of users exceeds the set number of persons.

2. The privacy protection device according to claim 1, wherein the processor is further configured to:
determine whether or not an added life log of a user satisfies the notification condition of the notification request the registration of which is accepted when the life log of the user is newly added, extract another user satisfying the notification condition when the added life log of the user satisfies the notification condition, and put on hold the notification of data relating to the life log satisfying the notification condition to the service provider when the number of extracted users does not reach the limit number of persons.

3. The privacy protection device according to claim 1, wherein the processor is further configured to:
determine whether or not an added life log of a user satisfies the notification condition of the notification request the registration of which is accepted when the life log of the user is newly added, extract another user satisfying the notification condition when the added life log of the user satisfies the notification condition, and notify the service provider of data relating to the life log satisfying the notification condition when the number of extracted users reaches the limit number of persons.

4. The privacy protection device according to claim 1, wherein the processor is further configured to:
maintain a registration history of a past notification request of the service provider; and
extract a registration history of a past notification request of a service provider from the notification request registration history database, with respect to the corresponding service provider that newly registers a notification request, and calculate a service available time period of the corresponding service provider by calculating an average duration time of the registration of the corresponding notification request.

5. A life log management system comprising:
a memory; and
a processor coupled to the memory, the processor configured to
calculate and record therein an update frequency of each attribute included in a life log of a user in response to storing of the life log,
calculate a threshold value of a change frequency on the basis of a service available time period of a service provider and a number of users satisfying a set number of persons,
extract an attribute of the recorded update frequency of which is less than or equal to the calculated threshold value of the change frequency,
extract a number of users satisfying a notification condition of a notification request, with respect to the extracted attribute, accept registration of the notification request from the service provider when the extracted number of users exceeds the set number of persons; and determine whether or not an added life log of a user satisfies the notification condition of the notification request the registration of which is accepted when the life log of the user is newly added, extract another user satisfying the notification condition of the notification request when the added life log of the user satisfies the notification condition, and notify the service provider of data relating to the life log satisfying the notification condition when the number of extracted users reaches the set number of persons.

6. A privacy protection method comprising:

calculating and recording, by a processor, an update frequency of each attribute included in a life log of a user in response to storing of the life log;

calculating, by a processor, a threshold value of a change frequency on the basis of a service available time period of a service provider and a number of users satisfying a set notification condition;

extracting, by a processor, an attribute of the update frequency of which is less than or equal to the calculated threshold value of the change frequency; and extracting, by a processor, a number of users satisfying a notification condition of the notification request, with respect to the extracted attribute; and accepting, by a processor, registration of the notification request from the service provider when it is determined that the extracted number of users exceeds the set number of persons.

7. A non-transitory computer-readable storage medium including a program for causing a computer including a processor and a memory to execute a privacy protection method, the method comprising:

calculating and recording therein an update frequency of each attribute included in a life log of a user in response to storing of the life log;

calculating a threshold value of a change frequency on the basis of a service available time period of a service provider and a number of users satisfying a set notification condition;

extracting an attribute of the update frequency of which is less than or equal to the calculated threshold value of the change frequency;

extracting a number of users satisfying a notification condition of the notification request, with respect to the extracted attribute; and accepting registration of the notification request from the service provider when it is determined that the extracted number of users exceeds the set number of persons.

* * * * *